(12) United States Patent
Watanabe et al.

(10) Patent No.: US 7,011,875 B2
(45) Date of Patent: Mar. 14, 2006

(54) OPTICAL INFORMATION-RECORDING MEDIUM AND DYE

(75) Inventors: Tetsuya Watanabe, Kanagawa (JP); Masatomi Sen, Kanagawa (JP); Hisashi Mikoshiba, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 67 days.

(21) Appl. No.: 10/826,254

(22) Filed: Apr. 19, 2004

(65) Prior Publication Data

US 2004/0213947 A1 Oct. 28, 2004

(30) Foreign Application Priority Data

Apr. 22, 2003 (JP) .................. P. 2003-117104

(51) Int. Cl.
B32B 3/02 (2006.01)
(52) U.S. Cl. ............... 428/64.1; 428/64.4; 428/64.8; 430/270.14; 430/339
(58) Field of Classification Search .......... 428/64.1, 428/64.4, 64.8, 913; 430/270.14, 270.15, 430/339, 945
See application file for complete search history.

(56) References Cited

U.S. PATENT DOCUMENTS

| 6,762,008 B1 * | 7/2004 | Satoh et al. | 430/270.16 |
| 2003/0068576 A1 * | 4/2003 | Satoh et al. | 430/270.16 |
| 2003/0235783 A1 * | 12/2003 | Liu et al. | 430/270.11 |
| 2004/0126702 A1 * | 7/2004 | Mikoshiba | 430/270.15 |

FOREIGN PATENT DOCUMENTS

| JP | 63-9577 A | 1/1988 |
| JP | 63-9578 A | 1/1988 |
| JP | 63-9579 A | 1/1988 |
| JP | 3-268994 A | 11/1991 |
| JP | 8-156408 A | 6/1996 |
| JP | 9-277703 A | 10/1997 |

* cited by examiner

Primary Examiner—Elizabeth Mulvaney
(74) Attorney, Agent, or Firm—Sughrue Mion, PLLC

(57) ABSTRACT

The present invention provides an optical information-recording medium capable of recording and reproducing information with laser beams and having excellent recording characteristics, the optical information-recording medium comprising a support and a recording layer capable of recording information by laser beam exposure, wherein the recording layer contains a dye represented by the following formula (I):

$$Q_2-N=N-Q_1-N=N-\underset{R^4-N}{\overset{B_1=B_2}{\underset{N}{\bigvee}}}-N\underset{R^2}{\overset{R^1}{\diagdown}} \quad (I)$$

wherein $R^1$, $R^2$, $R^3$ and $R^4$ each independently represents a hydrogen atom or a substituent; $B_1$ and $B_2$ represent $=CR^5-$ and $-CR^6=$ respectively, or one of $B_1$ and $B_2$ represents a nitrogen atom and the other represents $=CR^5-$ or $-CR^6=$; $R^5$ and $R^6$ each independently represents a hydrogen atom or a substituent; $Q_1$ represents a substituted or unsubstituted arylene group, or a substituted or unsubstituted divalent heterocyclic group; and $Q_2$ represents a substituted or unsubstituted aryl group, or a substituted or unsubstituted heterocyclic group.

7 Claims, No Drawings

OPTICAL INFORMATION-RECORDING MEDIUM AND DYE

FIELD OF THE INVENTION

The present invention relates to an optical information-recording medium capable of recording and reproducing information with laser beams. In particular, the present invention relates to a heat mode type optical information-recording medium containing an azo dye of a specific structure suitable for recording information by laser beam exposure.

BACKGROUND OF THE INVENTION

A one time optical information-recording medium (optical disc) capable of recording information by laser beams have been conventionally known. This optical disc is also called a direct read after write CD (so-called CD-R), and the typical structure of CD-R comprises a transparent disc-like support having provided thereon a recording layer containing an organic dye, a light-reflecting layer comprising metal, e.g., gold, and a protective layer of resin in this order from the support in lamination. Recording of information on CD-R is performed by irradiating CD-R with near infrared laser beams (laser beams of wavelength of near 780 nm, in general), the temperature of the irradiated part of the recording layer locally increases by absorbing the laser beams, and physical or chemical changes are caused (e.g., formation of pits) to alter the optical characteristics of the recording layer, thereby information is recorded. On the other hand, readout (reproduction) of information is also performed by the irradiation of laser beams of the same wavelength as used for recording. Information is reproduced by the detection of the difference in the reflectance between the part where the optical characteristics of the recording layer altered (recorded part) and the part where the optical characteristics did not alter (non-recorded part).

Optical recording media having higher recording density are demanded in recent years. To meet such a demand, optical discs referred to as direct read after write digital versatile discs (so-called DVD-R) are on the market. The DVD-R has the structure comprising a transparent disc-like support having pre-groove for tracking irradiation laser beams formed as narrow as half or less (from 0.74 to 0.8 µm) of that of CD-R, having provided thereon a recording layer comprising a dye, generally a light-reflecting layer on the recording layer, and if necessary a protective layer, and two sheets of this disc are adhered, or this disc and a protective support of the same form with the disc are adhered with an adhesive with the recording layer inside. The recording and reproduction on DVD-R are performed by irradiation with visible laser beams (generally laser beams of the wavelength of from 630 to 680 nm), and it is said that recording of higher density than with CD-R is possible. As the dyes used in the materials of optical recording discs, metal azo chelate dyes formed from an azo dye and a metal are disclosed. Representative examples of the metal azo chelate dyes are disclosed in the patent literatures, such as JP-A-63-9577, JP-A-63-9578, JP-A-63-9579, JP-A-3-268994, JP-A-8-156408 and JP-A-9-277703. (The term "JP-A" as used herein means an "unexamined published Japanese patent application".)

In recent years, networks such as Internet and high vision TV have spread rapidly. Further, broadcasting of HDTV (High Definition Television) is near at hand, so that the demands for recording media of high capacity for recording image information inexpensively and simply are increasing. Although DVD-R has secured the position as high capacity recording medium to some degree, it cannot be said that DVD-R has sufficiently great recording capacity capable of coping with the demands in the future. Accordingly, the development of optical discs having higher recording capacity has been advanced by the improvement of recording density with laser beams of shorter wavelength than DVD-R.

In an optical information-recording medium having a recording layer containing an organic dye, a recording and reproducing method of performing recording and reproducing of information by irradiating laser beams of the wavelength of 530 nm or less from a recording layer side toward a light reflecting layer side is disclosed. Specifically, a recording and reproducing method is proposed, which performs recording and reproducing of information by irradiating an optical disc containing, as the dyes of the recording layer, a porphyrin compound, an azo dye, a metal azo dye, a quinophthalone dye, a trimethine cyanine dye, a dicyanovinylphenyl skeleton dye, a coumarin compound, and a naphthalocyanine dye with blue (wavelength 430 nm, 488 nm) or blue-green (wavelength 515 nm) laser beams.

SUMMARY OF THE INVENTION

However, it has been found from the research by the present inventors that the optical disc using well-known dyes disclosed in the patent has not reached satisfactory levels of recording characteristics such as reflectance and degree of modulation, and also storage stability is not sufficient, thus there remains room for improvement.

On the other hand, for manufacturing optical recording discs inexpensively, a manufacturing method of discs by preparing ink (a coating solution) by dissolving dyes in a solvent and coating by spin coating is preferred. However, there is a problem that if solubility and solution stability of the dyes for use in optical recording discs are not sufficient, the manufacture by coating is impossible. Further, problems remained in the coating property of dyes and drying load in the manufacture of discs. The present inventors found these problems can be solved by with an azo dye having a specific structure, thus the present invention has been accomplished.

The present invention has been done on the basis of the problems of the prior art. A first object of the present invention is to provide an optical information-recording medium capable of high density recording and reproducing, and having excellent recording characteristics by irradiation with short wave laser beams of from 600 to 680 nm and/or laser beams of 450 nm or shorter wavelength.

A second object of the invention is to provide an optical information-recording medium capable of standing the storage of recorded information for a long period of time by designing a recording layer stable against light, high temperature and high humidity.

A third object is to provide a dye improved in solubility, coating property and drying load that come into problems in manufacturing discs.

The above objects of the invention have been solved by the following constitutions.

1) An optical information-recording medium comprising a support having provided thereon a recording layer capable of recording information by laser beam exposure, wherein the recording layer contains a dye represented by the following formula (I):

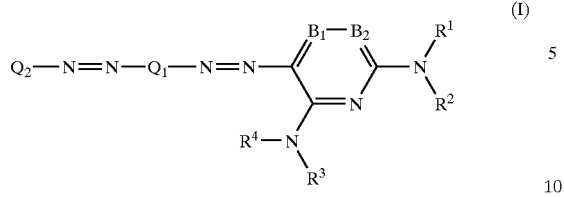
(I)

wherein $R^1$, $R^2$, $R^3$ and $R^4$ each independenly represents a hydrogen atom or a substituent; $B_1$ and $B_2$ represent =CR— or —$CR^6$= respectively, or one of $B_1$ and $B_2$ represents a nitrogen atom and the other represents =$CR^5$— or —$CR^6$=; $R^5$ and $R^6$ each independently represents a hydrogen atom or a substituent; $Q_1$ represents a substituted or unsubstituted arylene group, or a substituted or unsubstituted divalent heterocyclic group; and $Q_2$ represents a substituted or unsubstituted aryl group, or a substituted or unsubstituted heterocyclic group.

2) The optical information-recording medium as described in the above item 1), wherein $R^1$, $R^2$, $R^3$ and $R^4$ each independently represents a hydrogen atom, a substituted or unsubstituted alkyl group, a substituted or unsubstituted aryl group, or a substituted or unsubstituted heterocyclic group.

3) The optical information-recording medium as described in the above item 1), wherein the dye contained in the recording layer is represented by the following formula (II):

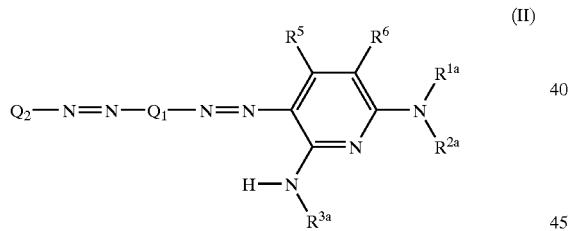
(II)

wherein $R^{1a}$, $R^{2a}$ and $R^{3a}$ each independenly represents a hydrogen atom, a substituted or unsubstituted alkyl group, a substituted or unsubstituted aryl group, or a substituted or unsubstituted heterocyclic group; $R^5$ and $R^6$ each independently represents a hydrogen atom or a substituent; $Q_2$ represents a substituted or unsubstituted aryl group, or a substituted or unsubstituted heterocyclic group; and $Q_1$ represents a group having the structure selected from the following formulae (a) to (k), these groups are divalent linking groups and linkable positions (*) may be linked with the azo group of any direction:

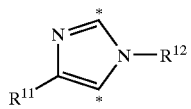
(a)

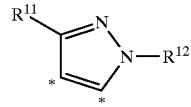
(b)

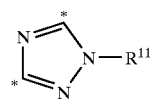
(c)

(d)

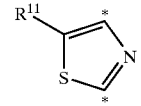
(e)

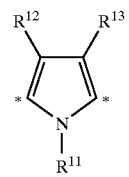
(f)

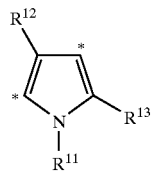
(g)

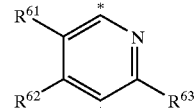
(h)

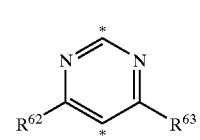
(i)

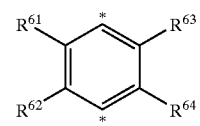
(j)

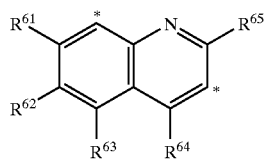
(k)

wherein $R^{11}$, $R^{12}$, $R^{13}$, $R^{61}$, $R^{62}$, $R^{63}$, $R^{64}$ and $R^{65}$ each independently represents a hydrogen atom or a substituent.

4) An optical information-recording medium comprising a support having provided thereon a recording layer capable of recording information by laser beam exposure, wherein the recording layer contains a metal azo chelate dye comprising a dye represented by the following formula (III) and at least one of a metal and a metal oxide:

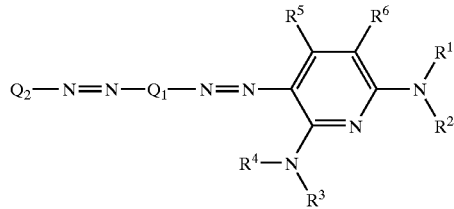

(III)

wherein $R^1$, $R^2$, $R^3$ and $R^4$ each independenly represents a hydrogen atom or a substituent; $R^5$ and $R^6$ each independently represents a hydrogen atom or a substituent; $Q_1$ represents a substituted or unsubstituted arylene group, or a substituted or unsubstituted divalent heterocyclic group; and $Q_2$ represents a substituted or unsubstituted aryl group, or a substituted or unsubstituted heterocyclic group. The expression that a metal azo chelate dye comprises a dye and at least one of a metal and a metal oxide, which is used in the present specification, includes the case where a metal and at least one dye form a metal azo chelate dye and a dissociative proton.

5) The optical information-recording medium as described in any of the above items 1) to 4), wherein the a refractive index (n) of the dye layer is 2.0<n<2.7, and the extinction coefficient (k) is 0.03<k<0.10.

6) A dye represented by the following formula (IV):

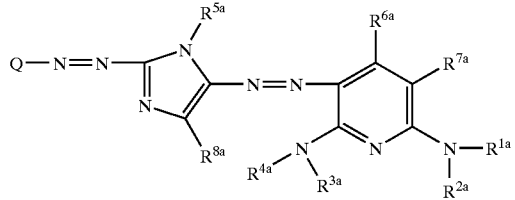

(IV)

wherein $R^{1a}$, $R^{2a}$, $R^{3a}$, $R^{4a}$ and $R^{5a}$ each independently represents a hydrogen atom, a substituted or unsubstituted alkyl group, a substituted or unsubstituted aryl group, or a substituted or unsubstituted heterocyclic group; $R^{6a}$, $R^{7a}$ and $R^{8a}$ each independently represents a hydrogen atom or a substituent; and Q represents a substituted or unsubstituted aryl group, or a substituted or unsubstituted heterocyclic group.

7) A dye represented by the following formula (V):

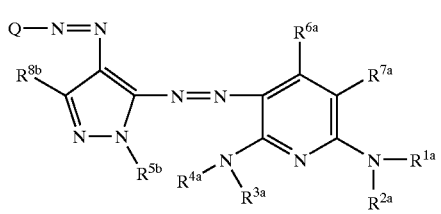

(V)

wherein $R^{1a}$, $R^{2a}$, $R^{3a}$, $R^{4a}$ and $R^{5b}$ each independently represents a hydrogen atom, a substituted or unsubstituted alkyl group, a substituted or unsubstituted aryl group, or a substituted or unsubstituted heterocyclic group; $R^{6a}$, $R^{7a}$ and $R^{8b}$ each independently represents a hydrogen atom or a substituent; Q represents a substituted or unsubstituted aryl group, or a substituted or unsubstituted heterocyclic group.

DETAILED DESCRIPTION OF THE INVENTION

The optical information-recording medium according to the invention is described in detail below.

The optical information-recording medium according to the invention is an optical information-recording medium comprising a support having provided thereon a recording layer capable of recording information by laser beam exposure, and contains an azo dye represented by formula (I) having a specific structure and/or a metal azo chelate dye.

In formula (I), $R^1$, $R^2$, $R^3$ and $R^4$ each independently represents a hydrogen atom or a substituent. As the specific examples of the substituents, the groups described later in $R^5$ and $R^6$ can be exemplified. Of these groups, preferred groups are a hydrogen atom, a substituted or unsubstituted alkyl group, a substituted or unsubstituted aryl group, a substituted or unsubstituted heterocyclic group, a substituted or unsubstituted acyl group, a substituted or unsubstituted aminocarbonyl group, an alkoxycarbonyl group, and an aryloxycarbonyl group. More preferred groups are a hydrogen atom, a substituted or unsubstituted alkyl group, a substituted or unsubstituted aryl group, and a substituted or unsubstituted heterocyclic group. $R^1$ and $R^2$, and $R^3$ and $R^4$ may be bonded to each other to form a cyclic structure respectively.

$R^1$, $R^2$, $R^3$ and $R^4$ each preferably represents an alkyl group (a substituted or unsubstituted alkyl group having from 1 to 20 carbon atoms, e.g., methyl, ethyl, n-propyl, n-butyl, n-hexyl, i-propyl, t-butyl, n-octyl, n-octadecyl, 2-methoxyethyl, 3-chloropropyl), an aryl group (a substituted or unsubstituted aryl group having from 6 to 20 carbon atoms, e.g., phenyl, naphthyl, p-methoxyphenyl, m-chlorophenyl, p-diethylaminophenyl), or a heterocyclic group (a substituted or unsubstituted heterocyclic group having from 1 to 20 carbon atoms, e.g., 2-pyridyl, 2-furyl). Of respective groups of $R^1$ and $R^2$, and $R^3$ and $R^4$, it is preferred that one of them represents a hydrogen atom and the other does not represent a hydrogen atom.

More preferably, either $R^1$ or $R^2$ represents a substituted or unsubstituted alkyl group having from 1 to 20 carbon atoms or a substituted or unsubstituted aryl group having from 6 to 20 carbon atoms, and the other represents a hydrogen atom. It is preferred that either $R^3$ or $R^4$ represents a substituted or unsubstituted alkyl group having from 1 to 20 carbon atoms or a substituted or unsubstituted aryl group having from 6 to 20 carbon atoms, and the other represents a hydrogen atom.

$B_1$ and $B_2$ represents $=CR^5-$ and $-CR^6=$ respectively, or one of $B_1$ and $B_2$ represents a nitrogen atom and the other represents $=CR^5-$ or $-CR=$. $R^5$ and $R^6$ each independently represents a hydrogen atom or a substituent. $B_1$ and $B_2$ preferably represents $=CR^5-$ and $-CR^6=$ respectively.

$R^5$ and $R^6$ each represents a hydrogen atom or a substituent. The examples of the substituents include a halogen atom, an alkyl group (including a cycloalkyl group and a bicycloalkyl group), an alkenyl group (including a cycloalkenyl group and a bicycloalkenyl group), an alkynyl group, an aryl group, a heterocyclic group, a cyano group, a hydroxyl group, a nitro group, a carboxyl group, an alkoxyl group, an aryloxy group, a silyloxy group, a heterocyclic oxy group, an acyloxy group, a carbamoyloxy group, an alkoxycarbonyloxy group, an aryloxycarbonyloxy group, an amino group (including an anilino group), an acylamino group, an aminocarbonylamino group, an alkoxycarbonylamino group, an aryloxycarbonylamino group, a sulfamoylamino group, an alkylsulfonylamino group, an arylsulfonylamino group, a mercapto group, an alkylthio group, an arylthio group, a heterocyclic thio group, a sulfamoyl group, a sulfo group, an alkylsulfinyl group, an arylsulfinyl group, an alkylsulfonyl group, an arylsulfonyl group, an acyl group, an aryloxycarbonyl group, an alkoxycarbonyl group, a carbamoyl group, an arylazo group, a heterocyclic azo group, an imido group, a phosphino group, a phosphinyl group, a phosphinyloxy group, a phosphinylamino group, and a silyl group.

More preferably $R^5$ and $R^6$ each represents a halogen atom (e.g., chlorine, bromine, iodine), an alkyl group [a straight chain, branched or cyclic, substituted or unsubstituted alkyl group, and the alkyl group includes an alkyl group (preferably an alkyl group having from 1 to 30 carbon atoms, e.g., methyl, ethyl, n-propyl, isopropyl, t-butyl, n-octyl, eicosyl, 2-chloroethyl, 2-cyanoethyl, 2-ethylhexyl), a cycloalkyl group (preferably a substituted or unsubstituted cycloalkyl group having from 3 to 30 carbon atoms, e.g., cyclohexyl, cyclopentyl, 4-n-dodecylcyclohexyl), a bicycloalkyl group (preferably a substituted or unsubstituted bicycloalkyl group having from 5 to 30 carbon atoms, i.e., a monovalent group obtained by taking one hydrogen atom from bicycloalkane having from 5 to 30 carbon atoms, e.g., bicyclo[1,2,2]heptan-2-yl, bicyclo[2,2,2]octan-3-yl), and tricyclic structure having many cyclic structures, and an alkyl group in substituents described hereafter (e.g., an alkyl group in an alkylthio group) also has the same concept], an alkenyl group [a straight, branched or cyclic, substituted or unsubstituted alkenyl group, and the alkenyl group include an alkenyl group (preferably a substituted or unsubstituted alkenyl group having from 2 to 30 carbon atoms, e.g., vinyl, allyl, prenyl, geranyl, oleyl), a cycloalkenyl group (preferably a substituted or unsubstituted cycloalkenyl group having from 3 to 30 carbon atoms, i.e., a monovalent group obtained by taking one hydrogen atom from cycloalkene having from 3 to 30 carbon atoms, e.g., 2-cyclopenten-1-yl, 2-cyclohexen-1-yl), a bicycloalkenyl group (a substituted or unsubstituted bicycloalkenyl group, preferably a substituted or unsubstituted bicycloalkenyl group having from 5 to 30 carbon atoms, i.e., monovalent group obtained by taking one hydrogen atom from bicycloalkene having one double bond, e.g., bicyclo[2,2,1]hept-2-en-1-yl, bicyclo[2,2,2]oct-2-en-4-yl)], an alkynyl group (preferably a substituted or unsubstituted alkynyl group having from 2 to 30 carbon atoms, e.g., ethynyl, propargyl, trimethylsilylethynyl), an aryl group (preferably a substituted or unsubstituted aryl group having from 6 to 30 carbon atoms, e.g., phenyl, p-tolyl, naphthyl, m-chlorophenyl, o-hexadecanoylaminophenyl), a heterocyclic group (preferably a monovalent group obtained by taking one hydrogen atom from a 5-or 6-membered substituted or unsubstituted, aromatic or non-aromatic heterocyclic compound, more preferably a 5- or 6-membered aromatic heterocyclic group having from 3 to 30 carbon atoms, e.g., 2-furyl, 2-thienyl, 2-pyrimidinyl, 2-benzothiazolyl), a cyano group, a hydroxyl group, a nitro group, a carboxyl group, an alkoxyl group (preferably a substituted or unsubstituted alkoxyl group having from 1 to 30 carbon atoms, e.g., methoxy, ethoxy, isopropoxy, t-butoxy, n-octyloxy, 2-methoxyethoxy), an aryloxy group (preferably a substituted or unsubstituted aryloxy group having from 6 to 30 carbon atoms, e.g., phenoxy, 2-methylphenoxy, 4-t-butylphenoxy, 3-nitrophenoxy, 2-tetradecanoylaminophenoxy), a silyloxy group (preferably a silyloxy group having from 3 to 20 carbon atoms, e.g., trimethylsilyloxy, t-butyldimethylsilyloxy), a heterocyclic oxy group (preferably a substituted or unsubstituted heterocyclic oxy group having from 2 to 30 carbon atoms, e.g., 1-phenyltetrazol-5-oxy, 2-tetrahydropyranyloxy), an acyloxy group (preferably a formyloxy group, a substituted or unsubstituted alkylcarbonyloxy group having from 2 to 30 carbon atoms, a substituted or unsubstituted arylcarbonyloxy group having from 6 to 30 carbon atoms, e.g., formyloxy, acetyloxy, pivaloyloxy, stearoyloxy, benzoyloxy, p-methoxyphenylcarbonyloxy), a carbamoyloxy group (preferably a substituted or unsubstituted carbamoyloxy group having from 1 to 30 carbon atoms, e.g., N,N-dimethylcarbamoyloxy, N,N-diethylcarbamoyloxy, morpholinocarbonyloxy, N, N-di-n-octylaminocarbonyloxy, N-n-octylcarbamoyloxy), an alkoxycarbonyloxy group (preferably a substituted or unsubstituted alkoxycarbonyloxy group having from 2 to 30 carbon atoms, e.g., methoxycarbonyloxy, ethoxycarbonyloxy, t-butoxycarbonyloxy, n-octylcarbonyloxy), an aryloxycarbonyloxy group (preferably a substituted or unsubstituted aryloxycarbonyloxy group having from 7 to 30 carbon atoms, e.g., phenoxycarbonyloxy, p-methoxyphenoxycarbonyloxy, p-n-hexadecyloxyphenoxycarbonyloxy), an amino group (preferably an amino group, a substituted or unsubstituted alkylamino group having from 1 to 30 carbon atoms, a substituted or unsubstituted anilino group having from 6 to 30 carbon atoms, e.g., amino, methylamino, dimethylamino, anilino, N-methylanilino, diphenylamino), an acylamino group (preferably a formylamino group, a substituted or unsubstituted alkylcarbonylamino group having from 1 to 30 carbon atoms, a substituted or unsubstituted arylcarbonylamino group having from 6 to 30 carbon atoms, e.g., formylamino, acetylamino, pivaloylamino, lauroylamino, benzoylamino, 3,4,5-ti-n-octyloxyphenylcarbonylamino), an aminocarbonylamino group (preferably a substituted or unsubstituted aminocarbonylamino group having from 1 to 30 carbon atoms, e.g., carbamoylamino, N,N-dimethylaminocarbonylamino, N,N-diethylaminoqarbonylamino, morpholinocarbonylamino), an alkoxycarbonylamino group (preferably a substituted or unsubstituted alkoxycarbonylamino group having from 2 to 30 carbon atoms, e.g., methoxycarbonylamino, ethoxycarbonylamino, t-butoxycarbonylamino, n-octadecyloxycarbonylamino, N-methylmethoxycarbonylamino), an aryloxycarbonylamino group (preferably a substituted or unsubstituted aryloxycarbonylamino group having from 7 to 30 carbon atoms, e.g., phenoxycarbonylamino, p-chlorophenoxycarbonylamino, m-n-octyloxyphenoxycarbonylamino), a sulfamoyl group (preferably a substituted or unsubstituted sulfamoylamino group having from 0 to 30 carbon atoms, e.g., sulfamoylamino, N,N-dimethylaminosulfonylamino, N-n-octylaminosulfonylamino), alkyl- and arylsulfonylamino groups (preferably a substituted or unsubstituted alkylsulfonylamino group having from 1 to 30 carbon atoms, a substituted or unsubstituted arylsulfonyl-amino group having from 6 to 30 carbon atoms, e.g., methylsulfonylamino, butylsulfonylamino, phenylsulfonylamino, 2,3,5-trichlorophenylsulfonylamino, p-methylphenylsulfonylamino), a mercapto group, an alkylthio group (preferably a substituted or unsubstituted alkylthio group having from 1 to 30 carbon atoms, e.g., methylthio, ethylthio, n-hexadecylthio), an arylthio group (preferably a substituted or unsubstituted arylthio group having from 6 to 30 carbon atoms, e.g., phenylthio, p-chlorophenylthio, m-methoxyphenylthio), a heterocyclic thio group (preferably a substituted or unsubstituted heterocyclic thio group having from 2 to 30 carbon atoms, e.g., 2-benzothiazolylthio, 1-phenyltetrazol-5-ylthio), a sulfamoyl group (preferably a substituted or unsubstituted sulfamoyl group having from 0 to 30 carbon atoms, e.g., N-ethylsulfamoyl, N-(3-dodecyloxypropyl)sulfamoyl, N,N-dimethylsulfamoyl, N-acetylsulfamoyl, N-benzoylsulfamoyl, N-(N'-phenylcarbamoyl)sulfamoyl), a sulfo group, alkyl- and arylsulfinyl groups (preferably a substituted or unsubstituted alkylsulfinyl group having from 1 to 30 carbon atoms, a substituted or unsubstituted arylsulfinyl group having from 6 to 30 carbon atoms, e.g., methylsulfinyl, ethylsulfinyl, phenylsulfinyl, p-methylphenylsulfinyl), alkyl- and arylsulfonyl groups (preferably a substituted or unsubstituted alkylsulfonyl group having from 1 to 30 carbon atoms, a substituted or unsubstituted arylsulfonyl group having from 6 to 30 carbon atoms, e.g., methylsulfonyl, ethylsulfonyl, phenylsulfonyl, p-methylphenylsulfonyl), an acyl group (preferably a formyl group, a substituted or unsubstituted alkylcarbonyl group having from 2 to 30 carbon atoms, a substituted or unsubstituted arylcarbonyl group having from 7 to 30 carbon atoms, a substituted or unsubstituted heterocyclic carbonyl group having from 4 to 30 carbon atoms bonded to a carbonyl group via a carbon atom, e.g., acetyl, pivaloyl, 2-chloroacetyl, stearoyl, benzoyl, p-n-octyloxyphenylcarbonyl, 2-pyridylcarbonyl, 2-furylcarbonyl), an aryloxycarbonyl group (preferably a substituted or unsubstituted aryloxycarbonyl group having from 7 to 30 carbon atoms, e.g., phenoxycarbonyl, o-chlorophenoxycarbonyl, m-nitrophenoxycarbonyl, p-t-butylphenoxycarbonyl), an alkoxycarbonyl group (preferably a substituted or unsubstituted alkoxycarbonyl group having from 2 to 30 carbon atoms, e.g., methoxycarbonyl, ethoxycarbonyl, t-butoxycarbonyl, n-octadecyloxycarbonyl), a carbamoyl group (preferably a substituted or unsubstituted carbamoyl group having from 1 to 30 carbon atoms, e.g., carbamoyl, N-methylcarbamoyl, N,N-dimethylcarbamoyl, N,N-di-n-octylcarbamoyl, N-(methylsulfonyl)carbamoyl), arylazo and heterocyclic azo groups (preferably a substituted or unsubstituted arylazo group having from 6 to 30 carbon atoms, a substituted or unsubstituted heterocyclic azo group having from 3 to 30 carbon atoms, e.g., phenylazo, p-chlorophenylazo, 5-ethylthio-1,3,4-thiadiazol-2-ylazo), an imido group (preferably N-succinimido, N-phthalimido), a phosphino group (preferably a substituted or unsubstituted phosphino group having from 2 to 30 carbon atoms, e.g., dimethylphosphino, diphenylphosphino, methylphenoxy-phosphino), a phosphinyl group (preferably a substituted or unsubstituted phosphinyl group having from 2 to 30 carbon atoms, e.g., phosphinyl, dioctyloxyphosphinyl, diethoxyphosphinyl), a phosphinyloxy group (preferably a substituted or unsubstituted phosphinyloxy group having from 2 to 30 carbon atoms, e.g., diphenoxyphosphinyloxy, dioctyloxyphosphinyloxy), a phosphinylamino group (preferably a substituted or unsubstituted phosphinylamino group having from 2 to 30 carbon atoms, e.g., dimethoxyphosphinylamino, dimethylaminophosphinylamino), or a silyl group (preferably a substituted or unsubstituted silyl group having from 3 to 30 carbon atoms, e.g., trimethylsilyl, t-butyldimethylsilyl, phenyldimethylsilyl).

Of the above functional groups, a hydrogen atom of the groups having a hydrogen atom may be taken and these groups may be further substituted with the above groups. As such functional groups, an alkylcarbonylaminosulfonyl group, an arylcarbonylaminosulfonyl group, an alkylsulfonylaminocarbonyl group, and an arylsulfonylaminocarbonyl group are exemplified. As the examples thereof, methylsulfonylaminocarbonyl, p-methylphenylsulfonylaminocarbonyl, acetylaminosulfonyl, and benzoylaminosulfonyl groups are exemplified.

$R^5$ preferably represents a hydrogen atom, an unsubstituted alkyl group having from 1 to 6 carbon atoms, a substituted or unsubstituted alkoxycarbonyl group having from 2 to 20 carbon atoms, a substituted or unsubstituted aminocarbonyl group having from 3 to 20 carbon atoms, a carboxyl group, or a cyano group. $R^6$ preferably represents a hydrogen atom, a substituted or unsubstituted alkyl group having from 1 to 20 carbon atoms, or a substituted or unsubstituted aryl group having from 6 to 20 carbon atoms, more preferably an unsubstituted alkyl group having from 1 to 6 carbon atoms.

$Q_2$ represents a substituted or unsubstituted aryl group or a substituted or unsubstituted heterocyclic group.

As the examples of monovalent heterocyclic groups, the following formulae (A-1) to (A-25) can be exemplified.

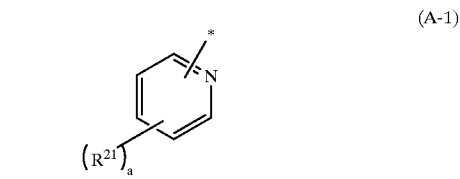

(A-1)

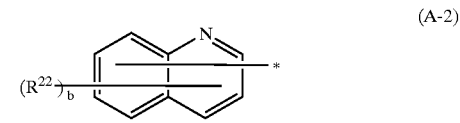

(A-2)

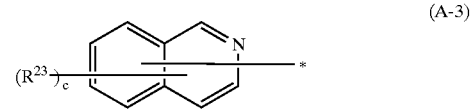

(A-3)

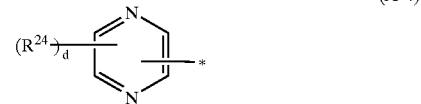

(A-4)

(A-5)

(A-6)

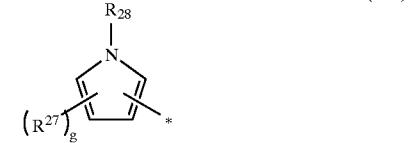

(A-7)

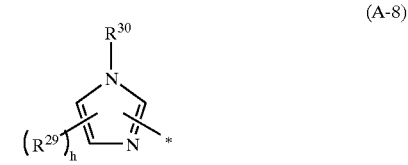

(A-8)

-continued

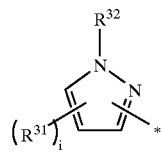 (A-9)

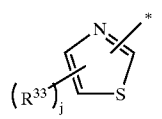 (A-10)

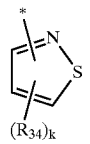 (A-11)

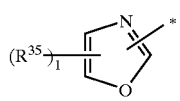 (A-12)

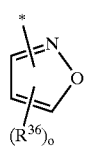 (A-13)

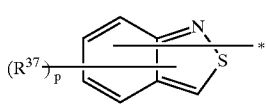 (A-14)

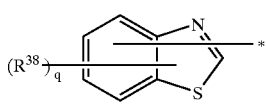 (A-15)

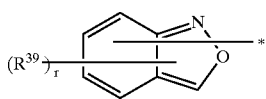 (A-16)

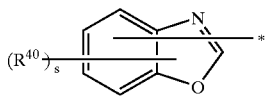 (A-17)

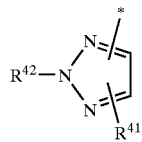 (A-18)

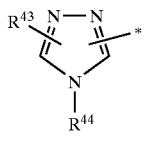 (A-19)

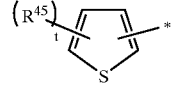 (A-20)

-continued

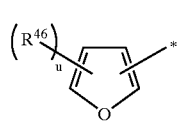 (A-21)

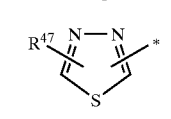 (A-22)

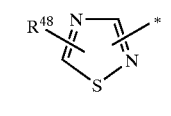 (A-23)

(A-24)

(A-25)

In the above formulae (A-1) to (A-25), $R^{21}$ to $R^{50}$ each independently represents a hydrogen atom or a substituent. The examples of the substituents are the same as the groups described in $R^5$ and $R^6$.

b and c each represents an integer of from 0 to 6.

a, p, q and r each represents an integer of from 0 to 4.

d, e, f, g, t and u each represents an integer of from 0 to 3.

h, i, j, k, l and o each represents an integer of from 0 to 2.

When a to u represent 2 or more, two or more substituents represented by $R^{21}$ to $R^{50}$ may be the same or different.

$Q_2$ preferably represent a substituted or unsubstituted aryl group.

$R^{61}$, $R^{62}$, $R^{63}$, $R^{64}$, $R^{65}$, $R^{66}$, $R^{71}$, $R^{72}$, $R^{11}$, $R^{12}$, $R^{13}$, $R^{14}$ and $R^{15}$ each independently represents a hydrogen atom or a substituent. The examples of the substituents are the same as the groups described in $R^5$ and $R^6$.

$Q_1$ represents a substituted or unsubstituted arylene group or a substituted or unsubstituted heterocyclic group, and $Q_1$ represents a divalent linking group from its structure. As the examples of divalent heterocyclic groups, heterocyclic groups to which the rings of the above shown formulae (A-1) to (A-25) can be linked by divalent linking, i.e., those in which any of $R^{21}$ to $R^{50}$ is a linking part, are exemplified.

$Q_1$ preferably represents a group having the structure selected from formulae (a) to (k). These groups are divalent or higher linking groups and linkable position (*) maybe linked with an azo group of any direction.

A dye represented by formula (I) is most preferably represented by formula (II).

In formula (II), $R^{1a}$, $R^{2a}$ and $R^{3a}$ each independently represents a hydrogen atom, a substituted or unsubstituted alkyl group, a substituted or unsubstituted aryl group, or a substituted or unsubstituted heterocyclic group. $R^5$ and $R^6$ each independently represents a hydrogen atom or a substituent; $Q_2$ represents a substituted or unsubstituted aryl group, or a substituted or unsubstituted heterocyclic group; and $Q_1$ represents a group having the structure selected from formulae (a) to (k), these groups are divalent or higher linking groups and linkable position (*) may be linked with the azo group of any direction.

In formulae (a) to (k), $R^{11}$, $R^{12}$, $R^{13}$, $R^{61}$, $R^{62}$, $R^{63}$, $R^{64}$ and $R^{65}$ each independently represents a hydrogen atom or a substituent. As the substituents, the groups described in $R^5$ and $R^6$ in formula (I) are exemplified.

The examples and preferred ranges of $R^{1a}$, $R^{2a}$ and $R^{3a}$ in formula (II) and the examples and preferred ranges of $R^1$, $R^2$ and R3 in formula (I) are the same, and the examples and preferred ranges of $R^5$ and $R^6$ in formula (II) are the same as the examples and preferred ranges of $R^5$ and $R^6$ described in $B_1$ and $B_2$ in formula (I).

The refractive index (n) of the dye as the recording layer including the dye is preferably 2.10<n<2.50, and the extinction coefficient (k) is preferably 0.03<k<0.09. A refractive index and an extinction coefficient can be easily measured with a rotating photon method (ellipsometry). As the measuring instrument, model V-VASE-S (a product of J.A. WOOLLAM Co.) is exemplified.

The specific examples of azo dyes for use in the invention are shown below, but the invention is not limited to these examples.

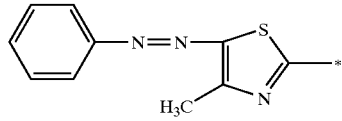

| Dye | Q | $R_1$ |
|---|---|---|
| 1) | 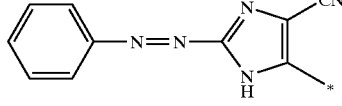 | H |
| 2) | 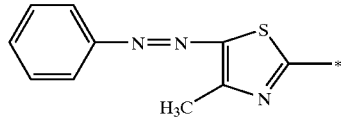 | H |
| 3) | 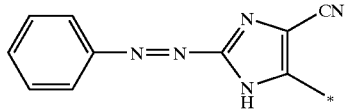 | CN |
| 4) | 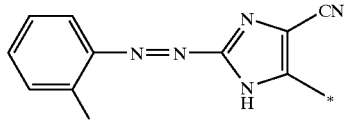 | CN |
| 5) | 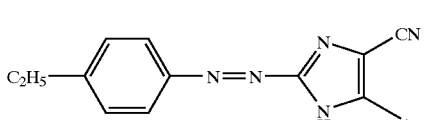 | CN |
| 6) | 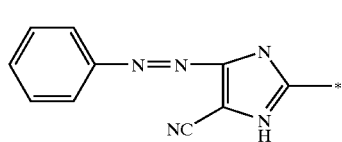 | CN |
| 7) |  | $CO_2C_2H_5$ |

-continued
| | | |
|---|---|---|
| 8) | 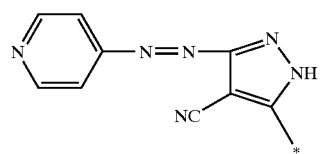 | Cl |
| 9) | 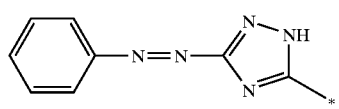 | H |
| 10) | 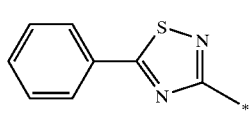 | H |
| 11) | 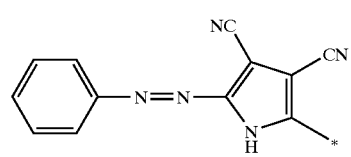 | H |
| 12) | 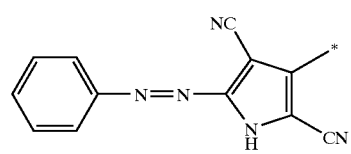 | CN |
| 13) | 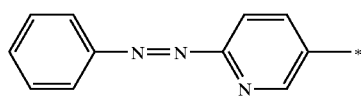 | H |
| 14) | 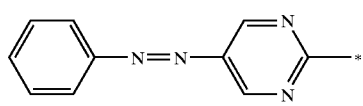 | H |
| 15) | 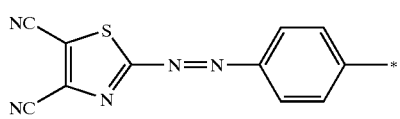 | H |
| 16) | 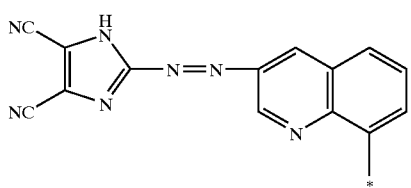 | H |

-continued
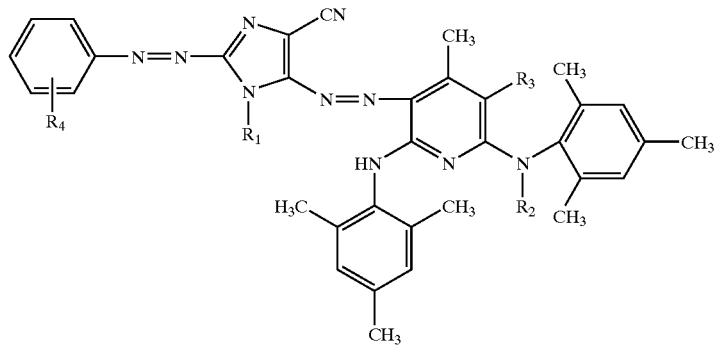
| Dye | $R_1$ | $R_2$ | $R_3$ | $R_4$ |
|---|---|---|---|---|
| 17) | 2-benzothiazolyl | H | CN | H |
| 18) | 2-benzothiazolyl | 2-benzothiazolyl | CN | 2-$SCH_3$ |
| 19) | *—$CH_2$—phenyl | *—$CH_2$—phenyl | H | 2-$CH_2CH_2CH_3$ |
| 20) | $CH_2CH_2CH_3$ | 2-benzothiazolyl | CN | 4-$OCH_3$ |
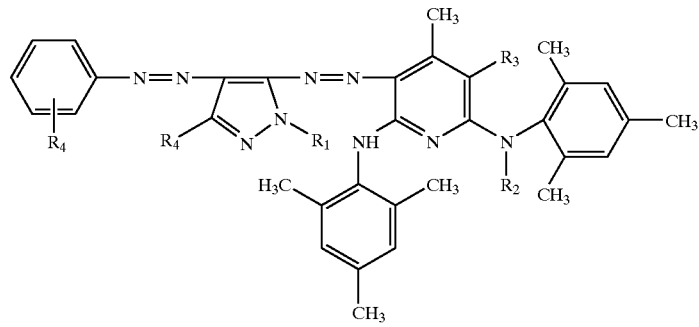
| Dye | $R_1$ | $R_2$ | $R_3$ | $R_4$ | $R_5$ |
|---|---|---|---|---|---|
| 21) | H | H | H | $CH_3$ | 2,4,6-tris$CH_3$ |
| 22) | 2-benzothiazolyl | H | H | $CH_3$ | 2,4,6-tris$CH_3$ |
| 23) | 2-benzothiazolyl | 2-benzothiazolyl | CN | CN | H |
| 24) | —$CH_2$-(1-naphthyl) | H | CN | CN | 2-$CH_2CH_3$ |

| | | | | | |
|---|---|---|---|---|---|
| 25) | —CH₂CH₃OCH₃ | H | CN | CN | 2-SCH₃ |
Dye 26) 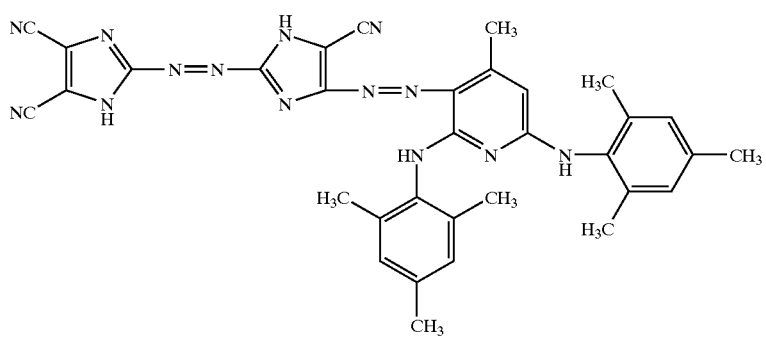
Dye 27) 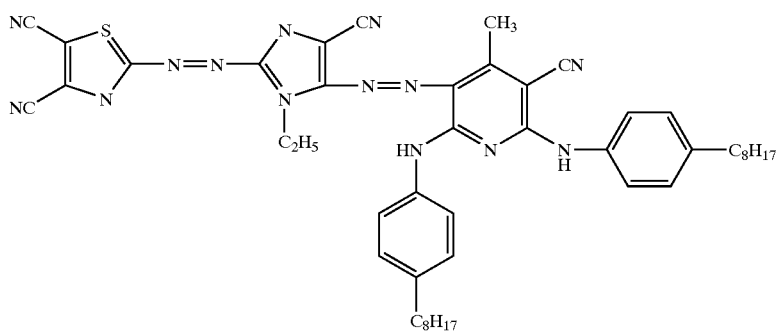
Dye 28) 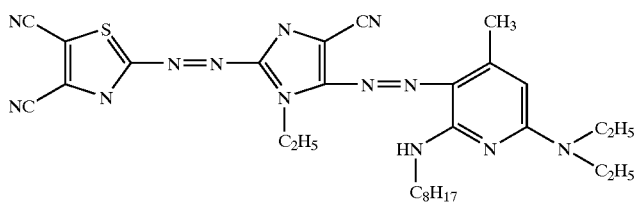
Dye 29) 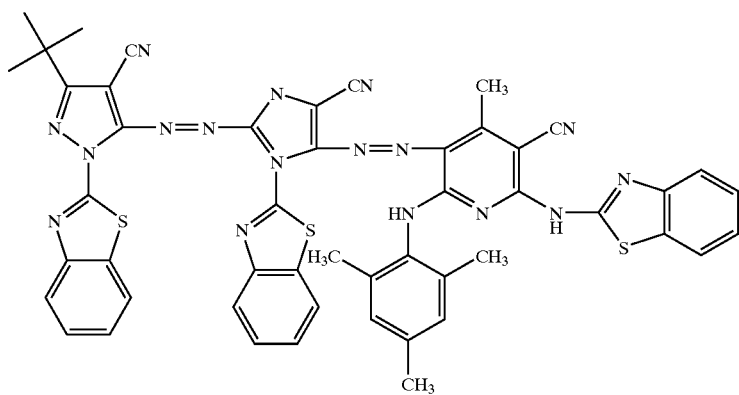

-continued

Dye 30)
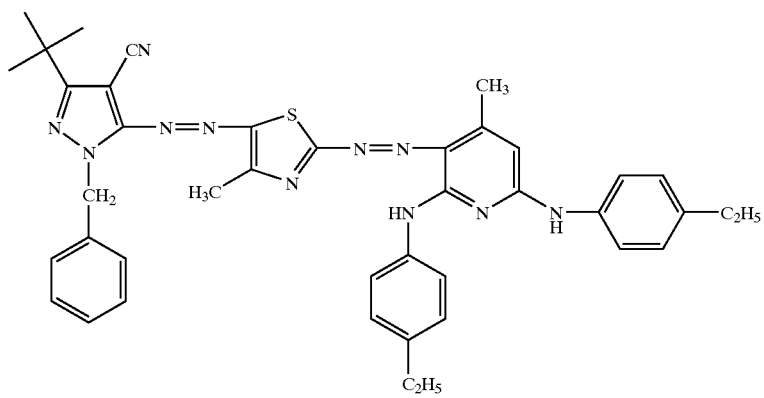

Dye 31)
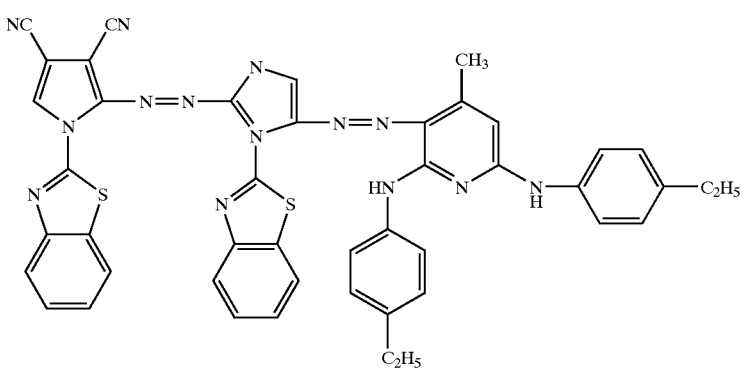

Dye 32) Ni chelate of Dye 17
Dye 33) Zinc chelate of Dye 17
Dye 34) Ni chelate of Dye 18
Dye 35) Ni chelate of Dye 21
Dye 36) Zinc chelate of Dye 21
Dye 37) Copper chelate of Dye 21
Dye 38) Ni chelate of Dye 22
Dye 39) Al chelate of Dye 23
Dye 40) Zinc chelate of Dye 23

Of the dyes for use in the invention, the dyes represented by the following formulae (IV) and (V) are newly synthesized as suitable for optical information-recording medium from the eager investigations by the present inventors.

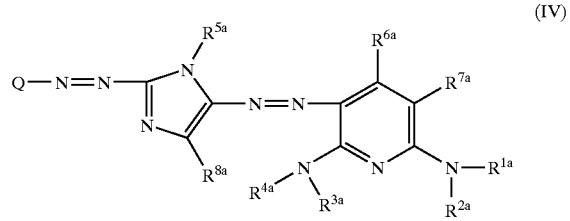
(IV)

wherein $R^{1a}$, $R^{2a}$, $R^{3a}$, $R^{4a}$ and $R^{5a}$ each independently represents a hydrogen atom, a substituted or unsubstituted alkyl group, a substituted or unsubstituted aryl group, or a substituted or unsubstituted heterocyclic group; $R^{6a}$, $R^{7a}$ and $R^{8a}$ each independently represents a hydrogen atom or a substituent; Q represents a substituted or unsubstituted aryl group, or a substituted or unsubstituted heterocyclic group.

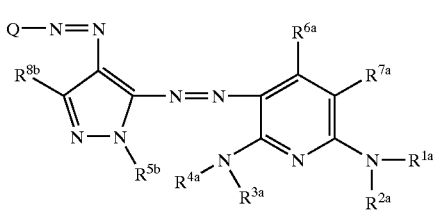
(V)

wherein $R^{1a}$, $R^{2a}$, $R^{3a}$, $R^{4a}$ and $R^{5b}$ each independently represents a hydrogen atom, a substituted or unsubstituted alkyl group, a substituted or unsubstituted aryl group, or a substituted or unsubstituted heterocyclic group; $R^{6a}$, $R^{7a}$ and $R^{8b}$ each independently represents a hydrogen atom or a substituent; Q represents a substituted or unsubstituted aryl group, or a substituted or unsubstituted heterocyclic group.

In formula (III), $R^1$ to $R^6$, $Q_1$ and $Q_2$ have the same meaning as in formula (I), and the examples and preferred ranges are also the same.

In formulae (IV) and (V), $R^{6a}$, $R^{7a}$, $R^{8a}$ and $R^{8b}$ have the same meaning as $R^1$ to $R^4$ in formula (I), and the examples and preferred ranges are also the same. $R^{1a}$, $R^{2a}$, $R^{3a}$, $R^{4a}$, $R^{5a}$ and $R^{5b}$ have the same meaning as $R^{1a}$ to $R^{3a}$ in formula (II), and the examples and preferred ranges are also the same. Q preferably represent a substituted or unsubstituted aryl group.

The dyes for use in the present invention other than the dyes represented by formulae (IV) and (V) can be synthesized according to synthesizing methods of ordinary dis-azo dyes, e.g., the methods disclosed in JP-A-59-133259. General synthesizing routes 1), 2) and 3) are shown below.

1)

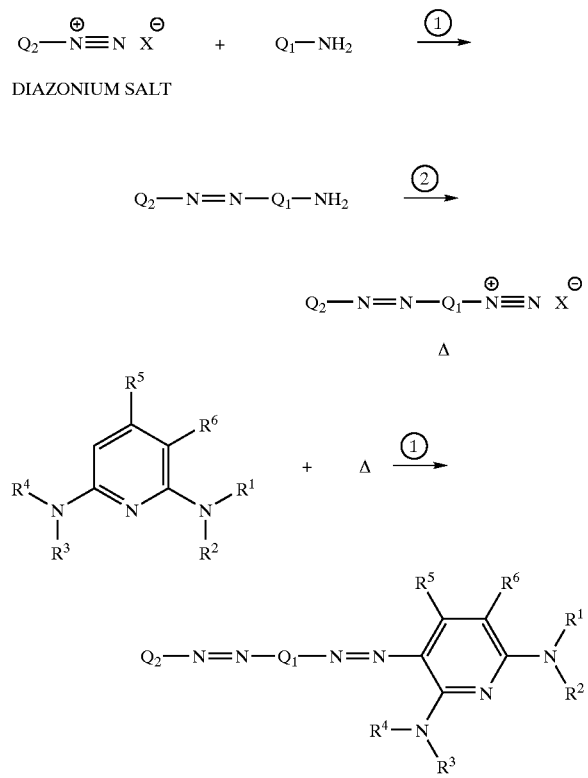

2)

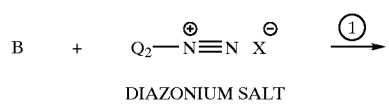

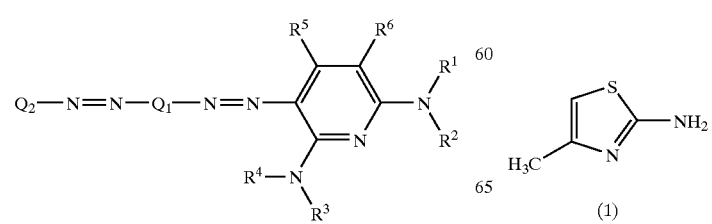

3)

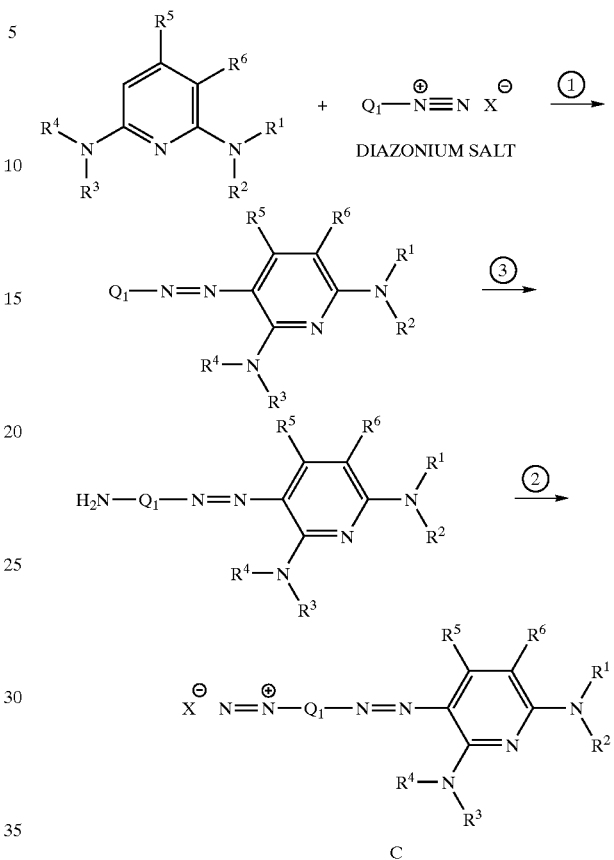

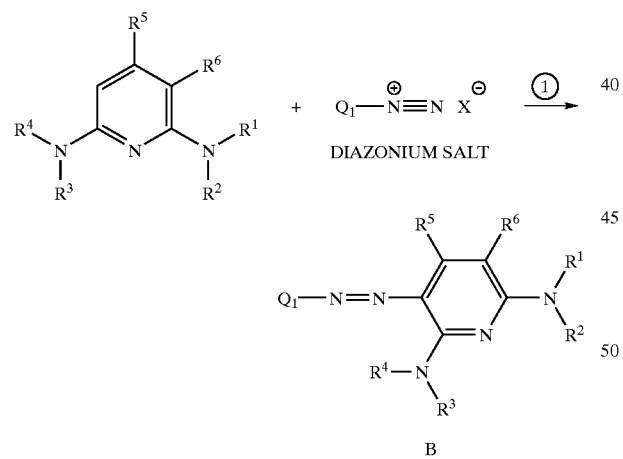

①, ②, and ③ respectively represent coupling reaction, diazotization, and amination reaction.

Synthetic intermediates $R^1$ to $R^6$, $Q_1$ and $Q_2$ respectively have the same meaning as $R^1$ to $R^6$, $Q_1$ and $Q_2$ in formula (I). X represents a counter ion.

SYNTHESIS EXAMPLE 1

Synthesis example of Exemplified Dye 1 is shown below.

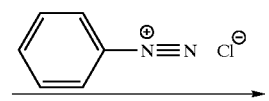

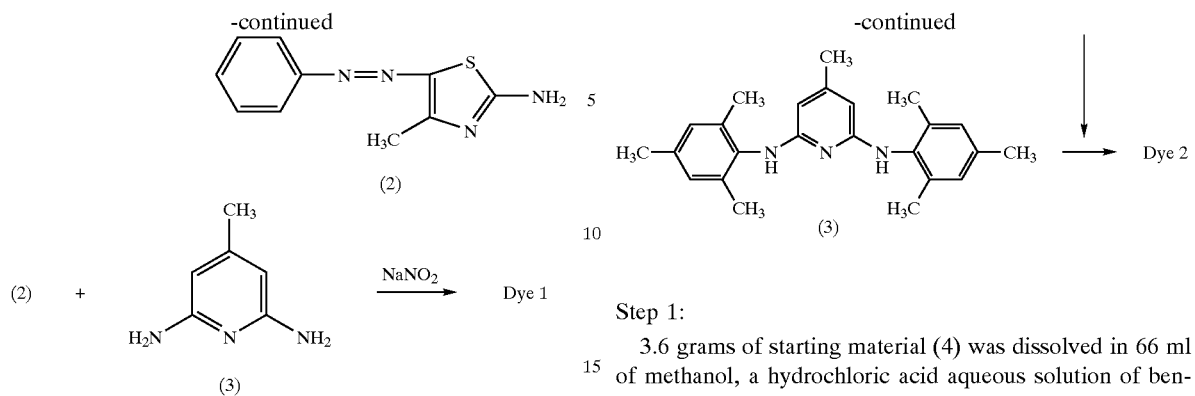

Step 1:

10 grams of hydrochloride of starting material (1) was dissolved in 110 g of ice water, a hydrochloric acid aqueous solution of benzenediazonium chloride prepared separately with 6.2 g of aniline was added thereto while cooling with ice, and sodium acetate was added to the above solution to adjust pH to 4. The reaction solution was stirred at room temperature for 30 minutes, and the precipitated solids were filtered out, thereby 14 g of (2) was obtained.

Step 2:

14 grams of intermediate (2) and 23 g of (3) were dissolved in 200 ml of formic acid, and 4.5 g of sodium nitrite was added to the above solution while cooling to 10° C. or lower. The reaction solution was stirred at room temperature for 30 minutes, and the precipitated solids were filtered out, purified with silica gel column chromatography, thereby 20 g of dye 1 was obtained.

The mass spectrum of the obtained dye 1 was measured and the structure of dye 1 was identified ($M^+$=589).

SYNTHESIS EXAMPLE 2

Synthesis example of Exemplified Dye 2 is shown below.

Step 1:

3.6 grams of starting material (4) was dissolved in 66 ml of methanol, a hydrochloric acid aqueous solution of benzenediazonium chloride prepared separately with 3 g of aniline was added thereto while cooling with ice, and sodium acetate was added to the above solution to adjust pH to 4. The reaction solution was stirred at room temperature for 30 minutes, and the precipitated solids were filtered out, thereby 4.3 g of (5) was obtained.

Step 2:

4.3 grams of intermediate (5) was dissolved in 45 ml of acetic acid and 45 ml of phosphoric acid, and 10 ml of a sulfuric acid solution of nitrosylsulfuric acid (30%) was added to the above solution while cooling to 0° C. or lower. The solution of the thus prepared (6) was added to a solution of 200 ml of methanol and 80 ml of pyridine containing 7 g of (3) at 10° C. or lower, and the crystals obtained were filtered and purified with silica gel column chromatography, thereby 10 g of dye 2 was obtained.

The mass spectrum of the obtained dye 2 was measured and the structure of dye 2 was identified ($M^+$=583).

SYNTHESIS EXAMPLE 3

Synthesis example of Exemplified Dyes 21 and 22 is shown below.

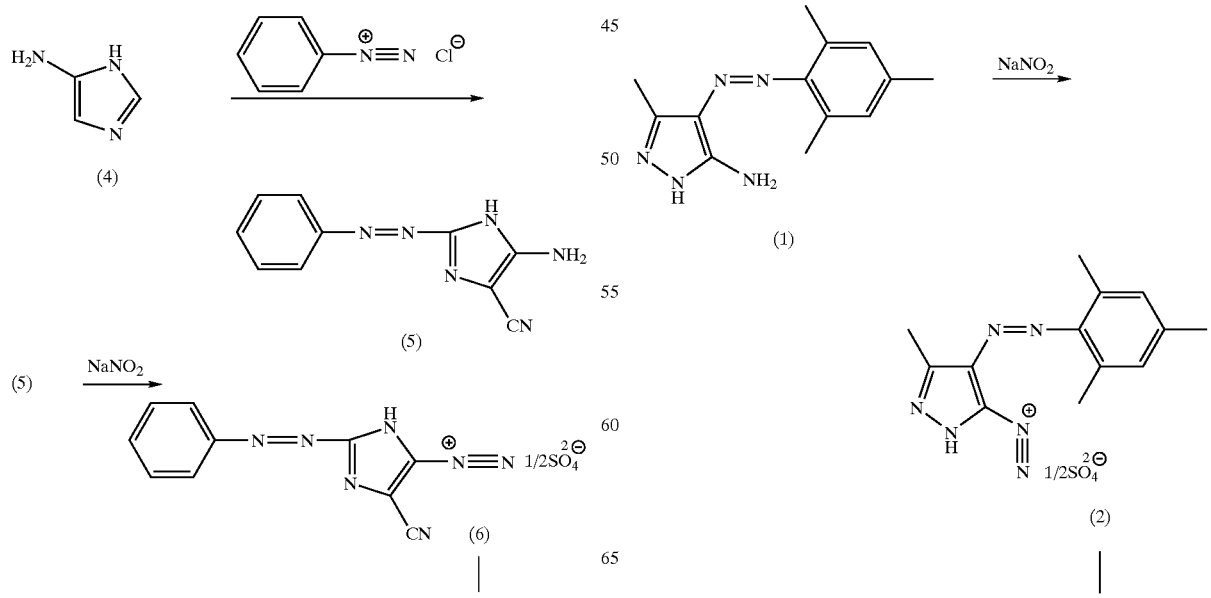

-continued

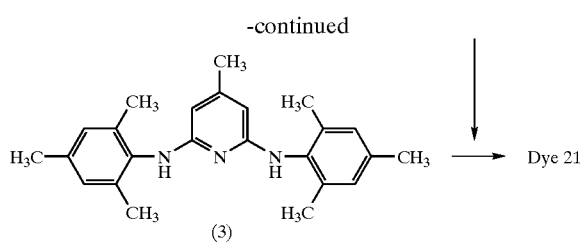 → Dye 21

Step 1:

1.6 grams of starting material (1) was dissolved in 15 ml of acetic acid and 15 ml of phosphoric acid, and 2 ml of a sulfuric acid solution of nitrosylsulfuric acid (40%) was added to the above solution while cooling to 0° C. or lower. The solution of the thus prepared (2) was added to a solution of 20 ml of acetone and 30 ml of pyridine containing 2.4 g of (3) at 10° C. or lower, and the crystals obtained were filtered and purified with silica gel column chromatography, thereby 3.8 g of dye 21 was obtained.

The mass spectrum of the obtained dye 21 was measured and the structure of dye 21 was identified ($M^+$=613).

Step 2:

1.0 gram of dye 21 was dissolved in 10 ml of DMSO and 0.6 g of 2-chlorobenzothiazole, and 0.45 g of potassium carbonate were added thereto, and the above solution was refluxed with heating for 1 hour. The reaction solution was poured into water, and the crystals obtained were filtered and purified with silica gel column chromatography, thereby 1.1 g of dye 22 was obtained.

The mass spectrum of the obtained dye 22 was measured and the structure of dye 22 was identified ($M^+$=747).

In the present invention, chelate azo dyes can be formed by the above azo dyes with metals or metal oxides. As metals of above-mentioned the metals and the metal oxides, transition metals are preferably used, e.g., $Ni^{2+}$, $Co^{2+}$, $Zn^{2+}$, $Fe^{3+}$, $Al^{3+}$, $Cu^{2+}$ and $Cr^{3+}$ are preferred, and $Ni^{2+}$, $Co^{2+}$ and $Zn^{2+}$ are particularly preferred above all.

In the optical recording disc of the invention, the above azo dyes may be used in combination with conventionally well-known dyes for optical recording disc. As such dyes, azo chelate dyes, oxonol dyes, cyanine dyes and phthalocyanine dyes are exemplified.

The optical information-recording medium in the present invention comprises a support having thereon a recording layer containing an azo dye having a specific structure. Optical information-recording medium having various structures are included in the invention. The optical information-recording medium according to the invention preferably comprises a disc-like support formed thereon pre-groove of a certain track pitch and having provided thereon a recording layer, a light-reflecting layer and a protective layer in this order, or comprises a disc-like support having thereon a light-reflecting layer, a recording layer and a protective layer in this order. Further, it is also preferred constitution that two laminates each comprising a transparent disc-like support formed thereon pre-groove of a certain track pitch and having provided thereon a recording layer and a light-reflecting layer are adhered with the recording layers inside.

When the optical information-recording medium according to the invention is applied to DVD-R, two laminates each comprising a transparent disc-like support having a thickness of 0.6±0.1 mm formed thereon pre-groove of a track pitch of from 0.6 to 0.9 μm and having provided a recording layer on the surface of the side on which the pre-groove is provided are adhered with the recording layers inside. The depth of pre-groove is generally from 0.05 to 100 μm, preferably from 0.1 to 50 μm.

When the optical information-recording medium according to the invention is applied to an optical disc for writing by laser beams of the wavelength of 450 nm or less, the track pitch is preferably from 0.2 to 0.8 μm, more preferably from 0.25 to 0.6 μm, and still more preferably from 0.27 to 0.4 μm.

The depth of the groove is preferably from 0.03 to 0.18 μm, more preferably from 0.05 to 0.15 μm, and particularly preferably from 0.06 to 0.1 μm.

As the optical information-recording medium according to the invention, the manufacturing method is described below taking as an example a medium having the constitution comprising a disc-like support having thereon a recording layer, a light-reflecting layer and a protective layer in this order.

The support of the optical information-recording medium according to the invention can be arbitrarily selected from various materials used as the support of conventional optical information-recording media. As the materials of supports, glass, acrylate resins, e.g., polycarbonate and polymethyl methacrylate, vinyl chloride resins, e.g., polyvinyl chloride and vinyl chloride copolymers, epoxy resin, amorphous polyolefin and polyester can be exemplified. These materials may be used in combination, if necessary. These materials can be used in the form of a film, or a rigid support. Polycarbonate is preferred from the point of moisture resistance, dimensional stability and price.

An undercoat layer may be provided on the surface of the support of the side on which a recording layer is provided for the purpose of improving surface properties, adhesion properties and prevention of the decomposition of a recording layer. As the materials of an undercoat layer, polymers, e.g., polymethyl methacrylate, acrylic acid-methacrylic acid copolymer, styrene-maleic anhydride copolymer, polyvinyl alcohol, N-methylolacrylamide, styrene-vinyltoluene copolymer, chlorosulfonated polyethylene, nitrocellulose, polyvinyl chloride, chlorinated polyolefin, polyester, polyimide, vinyl acetate-vinyl chloride copolymer, ethylene-vinyl acetate copolymer, polyethylene, polypropylene, and polycarbonate; and a surface improver such as a silane coupling agent. An undercoat layer can be formed by dissolving or dispersing these materials in an appropriate solvent to make a coating solution, and coating the coating solution on the surface of a support by spin coating, dip coating or extrusion coating. An undercoat layer has a layer thickness of generally from 0.005 to 20 μm, preferably from 0.01 to 10 μm.

A recording layer can be formed by dissolving the above dye compounds, and if necessary, a quencher and a binder, in a solvent to make a coating solution, and coating the coating solution on the surface of a support, and drying the coated film. As the solvents for the coating solution, esters, e.g., butyl acetate, ethyl lactate, and cellosolve acetate; ketones, e.g., methyl ethyl ketone, cyclohexanone and methyl isobutyl ketone; chlorinated hydrocarbons, e.g., dichloromethane, 1,2-dichloroethane, and chloroform; amides, e.g., dimethyl-formamide; hydrocarbons, e.g., methyl cyclohexane; ethers, e.g., dibutyl ether, diethyl ether, tetrahydrofuran and dioxane; alcohols, e.g., ethanol, n-propanol, isopropanol, n-butanol, diacetone alcohol; fluorine solvents, e.g., 2,2,3,3-tetrafluoropropanol; andglycol ethers, e.g., ethylene glycol monomethyl ether, ethylene glycol monoethyl ether, and propylene glycol monomethyl ether are exemplified. These solvents can be used alone, or two or more in combination, taking the solubility of dyes to be used into consideration. Various additives may be added to the coating solution according to purpose, e.g., an antioxidant, a UV absorber, a plasticizer, and a lubricant.

When a binder is used, the examples of binders include natural organic polymers, e.g., gelatin, cellulose derivatives, dextran, rosin and rubber; and synthetic organic polymers, e.g., precondensates of thermosetting resins, such as hydrocarbon resins, e.g., polyethylene, polypropylene, polystyrene, and polyisobutylene, vinyl resins, e.g., polyvinyl chloride, polyvinylidene chloride, and polyvinyl chloride-polyvinyl acetate copolymers, acrylate resins, e.g., methyl polyacrylate and methyl polymethacrylate, polyvinyl alcohol, chlorinated polyethylene, epoxy resin, butyral resin, rubber derivative, and phenol-formaldehyde resin. When a binder is used as the material of a recording layer, the use amount of a binder is generally from 0.01 to 50 time amount (by weight) of the dye, preferably from 0.1 to 5 time amount (by weight). The concentration of the dye in a coating solution prepared in such a manner is generally from 0.01 to 10 weight %, preferably from 0.1 to 5 weight %.

As coating methods, spray coating, spin coating, dip coating, roll coating, blade coating, doctor roll coating, screen printing are exemplified. A recording layer may be monolayer structure or multilayer structure. The thickness of a recording layer is generally from 20 to 500 nm, preferably from 30 to 300 nm, and more preferably from 50 to 100 nm.

Various discoloration inhibitors can be added to a recording layer for increasing light fastness. As the examples of discoloration inhibitors, singlet oxygen quenchers are generally used. Well-known singlet oxygen quenchers described in publications such as patent specifications can be used in the invention. The specific examples of singlet oxygen quenchers are disclosed in JP-A-58-175693, JP-A-59-81194, JP-A-60-18387, JP-A-60-19586, JP-A-60-19587, JP-A-60-35054, JP-A-60-36190, JP-A-60-36191, JP-A-60-44554, JP-A-60-44555, JP-A-60-44389, JP-A-60-44390, JP-A-60-54892, JP-A-60-47069, JP-A-63-209995, JP-A-4-25492, JP-B-1-38680, JP-B-6-26028, German Patent 350, 399, *Bulletin of Chemical Society, Japan*, October 1992, p. 1141. As a preferred example of singlet oxygen quencher, a compound represented by the following formula (Q) can be exemplified.

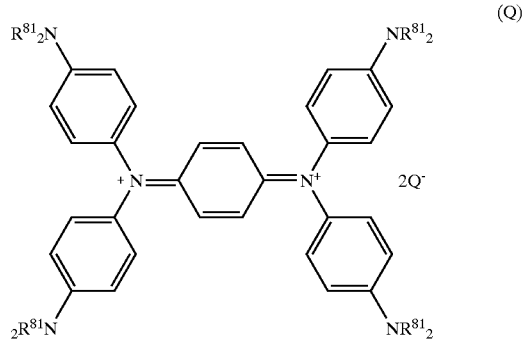

(Q)

wherein $R^{81}$ represents an alkyl group which may have a substituent, and $Q^-$ represents an anion.

In formula (Q), $R^{81}$ generally represents an alkyl group having from 1 to 8 carbon atoms which may have a substituent, and an unsubstituted alkyl group having from 1 to 6 carbon atoms is preferred. As the examples of the substituents of the alkyl group, a halogen atom (e.g., F, Cl), an alkoxyl group (e.g., methoxy, ethoxy), an alkylthio group (e.g., methylthio, ethylthio), an acyl group (e.g., acetyl, propionyl), anacyloxy group (e.g., acetoxy, propionyloxy), a hydroxyl group, an alkoxycarbonyl group (e.g., methoxycarbonyl, ethoxycarbonyl), an alkenyl group (e.g., vinyl), and an aryl group (e.g., phenyl, naphthyl) are exemplified. Of these groups, a halogen atom, an alkoxyl group, an alkylthio group and an alkoxycarbonyl group are preferred. The examples of preferred anions represented by $Q^-$ include $ClO_4^-$, $AsF_6^-$, $BF_4^-$ and $SbF_6^-$ can be exemplified.

The examples of compounds represented by formula (Q) are shown in Table 1 below.

TABLE 1

| Compound No. | R11 | Q⁻ |
| --- | --- | --- |
| Q-1 | $CH_3$ | $ClO_4^-$ |
| Q-2 | $C_2H_5$ | $ClO_4^-$ |
| Q-3 | $n\text{-}C_3H_7$ | $ClO_4^-$ |
| Q-4 | $n\text{-}C_4H_9$ | $ClO_4^-$ |
| Q-5 | $n\text{-}C_5H_{11}$ | $ClO_4^-$ |
| Q-6 | $n\text{-}C_4H_9$ | $SbF_6^-$ |
| Q-7 | $n\text{-}C_4H_9$ | $BF_4^-$ |
| Q-8 | $n\text{-}C_4H_9$ | $AsF_6^-$ |

The use amount of discoloration inhibitors, e.g., the above singlet oxygen quenchers, is generally from 0.1 to 50 weight % of the amount of the dye, preferably from 0.5 to 45 weight %, more preferably from 3 to 40 weight %, and particularly preferably from 5 to 25 weight %.

It is preferred to provide a light-reflecting layer in contiguous to a recording layer for the purpose of improving reflectance in reproducing information. Light reflecting substances that are the materials of the light-reflecting layer are materials having high reflectance to laser beams. As the examples of light reflecting substances, metals or semimetals, e.g., Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn and Bi, or stainless steel can be exemplified. These substances may be used alone, or two or more of them may be used in combination, or may be used as alloys. Of these substances, Cr, Ni, Pt, Cu, Ag, Au, Al and stainless steel are preferred, Au metal, Ag metal, Al metal and the alloys of these metals are particularly preferred, and Ag metal, Al metal and the alloys of these metals are most preferred. A light-reflecting layer can be formed on a support or a recording layer by, e.g., vacuum deposition, sputtering or ion plating. The layer thickness of a light-reflecting layer is generally from 10 to 300 nm, preferably from 50 to 200 nm.

It is preferred to provide a protective layer on a light-reflecting layer or a recording layer for physically or chemically protecting a recording layer. Further, when the optical information-recording medium of the invention takes the same constitution as the case of manufacture of DVD-R type optical information-recording medium, that is, when two supports are adhered with the recording layers inside, a protective layer need not be provided. As the examples of the materials for a protective layer, inorganic substances, e.g., SiO, $SiO_2$, $MgF_2$, $SnO_2$ and $Si_3N_4$, organic substances, e.g., thermoplastic resins, thermosetting resins and UV-curable resins are exemplified. A protective layer can be formed by laminating a film obtained by an extrusion process of plastics on a light-reflecting layer with an adhesive. Alternatively, a protective layer maybe formed by vacuum deposition, sputtering or coating. When thermoplastic resins or thermosetting resins are used, a protective layer can be formed by dissolving these resins in an appropriate solvent to prepare a coating solution, coating the coating solution and drying. In the case of UV-curable resins, the resins can be used as they are, or by dissolving the resins in an appropriate solvent to prepare a coating solution, coating the coating solution, and subjecting to exposure with UV rays, thereby a protective layer can be formed. Various additives, e.g., an antistatic agent, an antioxidant, and a UV absorber can be added to the coating solution, if necessary. The thickness of a protective layer is generally from 0.1 µm to 1 mm. A laminate having a recording layer, a light-reflecting layer and a protective layer on a support, or a light-reflecting layer, a recording layer and a protective layer on a support can be formed by the above described processes.

Optical information recording in the present invention is performed with the optical information-recording medium in the following manner. In the first place, an optical information-recording medium is irradiated with light for recording, e.g., semiconductor laser beams, from the support side or the protective layer side with rotating the optical information-recording medium at a constant linear velocity or a constant angular velocity. It is thought that the temperature of the recording layer locally increases by absorbing the laser beams, and physical or chemical changes are caused (e.g., formation of pits) to alter the optical characteristics of the recording layer, thereby information is recorded. When the optical information-recording medium of the invention is applied to DVD-R, a semiconductor laser having oscillation wavelength of from 600 to 700 nm is used as a recording light, preferably from 620 to 680 nm, and more preferably from 630 to 670 nm.

It is also preferred for the medium to be applied to an optical recording disc where a semiconductor laser having oscillation wavelength of from 390 to 550 nm is used as a recording light. As preferred light sources in that case, a blue violet semiconductor laser having oscillation wavelength of from 390 to 415 nm, a blue violet semiconductor laser having central oscillation wavelength of 515 nm, and a blue violet SHG laser having central oscillation wavelength of 425 nm that is obtained by halving the wavelength of an infrared semiconductor laser having central oscillation wavelength of 850 nm with a photo-guiding cell can be exemplified. In view of recording density, it is particularly preferred to use a blue violet semiconductor or SHG laser. The reproduction of the recorded information can be effected by irradiating the optical information-recording medium from the support side or the protective layer side with rotating the medium at the same constant linear velocity, and by detecting the reflected light.

EXAMPLES

The present invention is described in further detail with reference to the following examples, but the present invention is not limited thereto.

Example 1

A coating solution for forming a recording layer having dye concentration of 1 weight % was prepared by dissolving dye 1 in 2,2,3,3-tetrafluoropropanol. The coating solution was coated by spin coating on the surface of a polycarbonate support (diameter: 120 mm, thickness: 0.6 mm) of the side on which spiral pre-groove (track pitch: 0.8 µm, the breadth of groove: 0.4 µm, the depth of groove: 0.15 µm) was formed by injection molding, thereby a recording layer was formed (the thickness in the groove: 200 nm).

In the next place, a light-reflecting layer having a thickness of about 100 nm was formed on the recording layer by sputtering silver, thereby a laminate comprising a support having provided thereon a recording layer and a light-reflecting layer in this order was prepared. A transparent polycarbonate support (a disc-like protective support having a diameter of 120 mm and a thickness of 0.6 mm) was prepared separately. The above-obtained laminate and the disc-like protective support were joined with an adhesive (a product of Three Bond Co., Ltd.) with the recording layer inside (thickness: 1.2 mm). According to these processes, DVD-R type optical recording disc in the invention was manufactured.

Examples 2 to 9

Optical discs for evaluation were prepared with dyes shown in Table 2 below.

Evaluation as Optical Disc:

14T-EFM signal was recorded on the prepared DVD-R type optical information-recording disc with a semiconductor laser having oscillation wavelength of 635 nm at a linear velocity of 3.68 m/sec, and the recorded signal was then reproduced. The degree of modulation, groove reflectance and sensitivity were measured at optimal power. Recording and evaluation of recording characteristics were performed with OMT2000 (a product of Pulse Tech Products Corporation).

The above-manufactured optical disc was subjected to light fastness test with a merry-go-round type fadeometer of 100,000 lux. The disc was exposed to the fadeometer for three days without a UV filter. It can be seen from the results shown in Table 2 that the optical recording discs having recording layers containing the dyes of the invention (Examples 1 to 9) are excellent in light fastness as compared with the recording disc having a recording layer containing comparative dye a (Comparative Example 1).

Every disc was high in degree of modulation and sensitivity.

TABLE 2

| Example No. | Dye Compound in Recording Layer | Light Discoloration (residual rate) |
| --- | --- | --- |
| Example 1 | 1 | 90 |
| Example 2 | 2 | 91 |
| Example 3 | 3 | 86 |
| Example 4 | 17 | 92 |
| Example 5 | 20 | 91 |
| Example 6 | 21 | 92 |
| Example 7 | 23 | 89 |
| Example 8 | 26 | 94 |
| Example 9 | 31 | 91 |
| Example 10 | 32 | 98 |
| Example 11 | 33 | 98 |
| Example 12 | 34 | 96 |
| Example 13 | 35 | 96 |
| Comparative Example 1 | a | 88 | a is Ni chelate of the following formula. (disclosed in JP-A-11-166125)

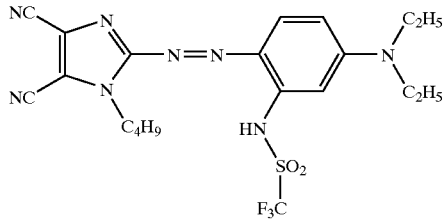

By using the dye according to the invention, a high sensitivity optical information-recording medium showing high reflectance to laser beams and high degree of modulation can be obtained. According to the present invention, an optical information-recording medium excellent in light fastness can be obtained.

The present invention claims foreign priority based on Japanese Patent application no. 2003-117104, filed on Apr. 22, 2003, the contents of which is incorporated herein by reference.

What is claimed is:

1. An optical information-recording medium comprising:
a support; and
a recording layer capable of recording information by laser beam exposure,
wherein the recording layer contains a dye represented by the following formula (I):

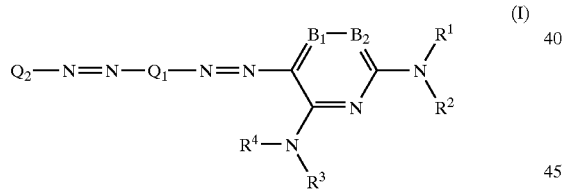

wherein $R^1$, $R^2$, $R^3$ and $R^4$ each independently represents a hydrogen atom or a substituent; $B_1$ and $B_2$ represent $=CR^5-$ and $-CR^6=$ respectively, or one of $B_1$ and $B_2$ represents a nitrogen atom and the other represents $=CR^5-$ or $-CR^6=$; $R^5$ and $R^6$ each independently represents a hydrogen atom or a substituent; $Q_1$ represents a substituted or unsubstituted arylene group, or a substituted or unsubstituted divalent heterocyclic group; and $Q_2$ represents a substituted or unsubstituted aryl group, or a substituted or unsubstituted heterocyclic group.

2. The optical information-recording medium as claimed in claim 1, wherein $R^1$, $R^2$, $R^3$ and $R^4$ each independently represents a hydrogen atom, a substituted or unsubstituted alkyl group, a substituted or unsubstituted aryl group, or a substituted or unsubstituted heterocyclic group.

3. The optical information-recording medium as claimed in claim 1, wherein the dye contained in the recording layer is represented by the following formula (II):

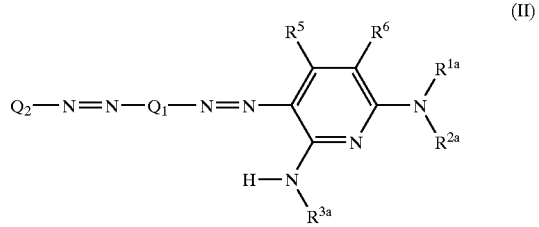

wherein $R^{1a}$, $R^{2a}$ and $R^{3a}$ each independently represent a hydrogen atom, a substituted or unsubstituted alkyl group, a substituted or unsubstituted aryl group, or a substituted or unsubstituted heterocyclic group; $R^5$ and $R^6$ each independently represent a hydrogen atom or a substituent; $Q_2$ represents a substituted or unsubstituted aryl group, or a substituted or unsubstituted heterocyclic group; and $Q_1$ represents a divalent linking group selected from the following formulae (a) to (k) having positions (*) that are linkable with the azo groups in formula (II) in any direction:

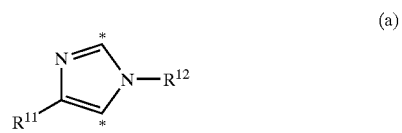

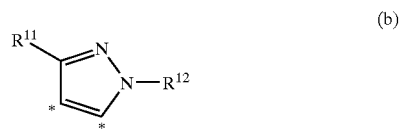

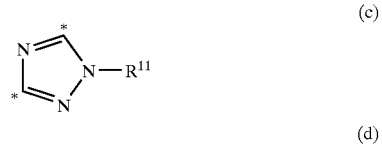

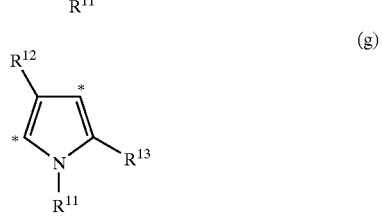

-continued (h)

R⁶¹, R⁶², R⁶³ pyridine (i)

R⁶², R⁶³ pyrimidine (j)

R⁶¹, R⁶², R⁶³, R⁶⁴ benzene (k)

R⁶¹, R⁶², R⁶³, R⁶⁴, R⁶⁵ quinoline wherein $R^{11}$, $R^{12}$, $R^{13}$, $R^{61}$, $R^{62}$, $R^{63}$, $R^{64}$ and $R^{65}$ each represents a hydrogen atom or a substituent.

4. An optical information-recording medium comprising:
a support; and
a recording layer capable of recording information by laser beam exposure,
wherein the recording layer contains a metal azo chelate dye comprising: a dye represented by the following formula (III); and at least one of a metal and a metal oxide:

(III)

$Q_2-N=N-Q_1-N=N-$ pyridine with R⁵, R⁶, R¹, R², R³, R⁴ wherein $R^1$, $R^2$, $R^3$ and $R^4$ each independently represents a hydrogen atom or a substituent; $R^5$ and $R^6$ each independently represents a hydrogen atom or a substituent; $Q_1$ represents a substituted or unsubstituted arylene group, or a substituted or unsubstituted divalent heterocyclic group; and $Q_2$ represents a substituted or unsubstituted aryl group, or a substituted or unsubstituted heterocyclic group.

5. The optical information-recording medium as claimed in claim 1, wherein the recording layer including the dye has a refractive index (n) of 2.0<n<2.7, and an extinction coefficient (k) of 0.03<k<0.10.

6. A dye represented by the following formula (IV):

(IV)

wherein $R^{1a}$, $R^{2a}$, $R^{3a}$, $R^{4a}$ and $R^{5a}$ each independently represents a hydrogen atom, a substituted or unsubstituted alkyl group, a substituted or unsubstituted aryl group, or a substituted or unsubstituted heterocyclic group; $R^{6a}$, $R^{7a}$ and $R^{8a}$ each independently represents a hydrogen atom or a substituent; and Q represents a substituted or unsubstituted aryl group, or a substituted or unsubstituted heterocyclic group.

7. A dye represented by the following formula (V):

(V)

$Q-N=N-$ pyrazole linked to pyridine with R⁶ᵃ, R⁷ᵃ, R⁸ᵇ, R⁵ᵇ, R⁴ᵃ, R³ᵃ, R¹ᵃ, R²ᵃ wherein $R^{1a}$, $R^{2a}$, $R^{3a}$, $R^{4a}$ and $R^{5b}$ each independently represents a hydrogen atom, a substituted or unsubstituted alkyl group, a substituted or unsubstituted aryl group, or a substituted or unsubstituted heterocyclic group; $R^{6a}$, $R^{7a}$ and $R^{8b}$ each independently represents a hydrogen atom or a substituent; and Q represents a substituted or unsubstituted aryl group, or a substituted or unsubstituted heterocyclic group.

* * * * *